(12) United States Patent
Koide et al.

(10) Patent No.: US 8,182,658 B2
(45) Date of Patent: May 22, 2012

(54) ELECTROCHEMICAL DEVICE AND EXHAUST GAS PURIFICATION APPARATUS

(75) Inventors: Naotaka Koide, Aichi (JP); Nami Ikeda, Aichi (JP); Hiroyasu Kawauchi, Aichi (JP); Yoshifumi Kato, Aichi (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 773 days.

(21) Appl. No.: 12/274,630

(22) Filed: Nov. 20, 2008

(65) Prior Publication Data
US 2009/0301870 A1 Dec. 10, 2009

(30) Foreign Application Priority Data
Nov. 20, 2007 (JP) .................. 2007-300624

(51) Int. Cl.
*C25B 13/02* (2006.01)
*C25B 13/04* (2006.01)
*C25B 1/00* (2006.01)
*H01M 8/10* (2006.01)
*H01M 8/12* (2006.01)

(52) U.S. Cl. ........ 204/252; 204/265; 204/266; 204/295; 205/555; 205/615; 429/491; 429/495

(58) Field of Classification Search .................. None
See application file for complete search history.

(56) References Cited

U.S. PATENT DOCUMENTS

| | | | | | |
|---|---|---|---|---|---|
| 4,976,860 | A | * | 12/1990 | Takahashi et al. | 210/500.28 |
| 5,387,330 | A | * | 2/1995 | Taniguchi et al. | 204/421 |
| 5,672,437 | A | * | 9/1997 | Yajima | 429/495 |
| 2004/0166386 | A1 | * | 8/2004 | Herman et al. | 429/22 |
| 2005/0167271 | A1 | * | 8/2005 | Gajek | 204/600 |
| 2005/0208365 | A1 | * | 9/2005 | Fetcenko et al. | 429/40 |

FOREIGN PATENT DOCUMENTS

| JP | 08-066621 A | 3/1996 |
|---|---|---|
| JP | 2003-265931 | 9/2003 |

OTHER PUBLICATIONS

Office Action for corresponding Japanese Application No. 2007-300624, dated Jan. 25, 2011.

* cited by examiner

*Primary Examiner* — Harry D Wilkins, III
(74) *Attorney, Agent, or Firm* — Locke Lord LLP (57) ABSTRACT

An anode 20 of an electrochemical device 10 is connected to the cathode of a battery 30, and a cathode 22 of the electrochemical device 10 is connected to the anode of the battery. An electrolyte layer 24 containing electrolytes is arranged between the anode 20 and the cathode 22. Electrolyte layer 24 is formed by alternately laminating two types of electrolytes formed in the shape of plates. A first electrolyte is a proton conductor 26, and a second electrolyte is an oxygen ion conductor 28. A purification apparatus 120 includes a plurality of electrochemical devices 10.

3 Claims, 11 Drawing Sheets

ELECTROCHEMICAL DEVICE AND EXHAUST GAS PURIFICATION APPARATUS

BACKGROUND OF THE INVENTION

1. Field of the Invention

The present invention relates to an electrochemical device and an exhaust gas purification apparatus, and more particularly, to the construction of an electrolyte layer thereof.

2. Description of the Related Art

Electrochemical devices promote chemical reactions by utilizing the ion conductivity of an electrolyte, and these devices are used in various applications. Examples of such applications include purification apparatuses (namely, electrochemical reactors), which decompose harmful components present in exhaust gas, and fuel cells, hydrogen generation apparatuses, etc.

Electrochemical devices have electrolytes between an anode and a cathode, and the properties of these electrochemical devices are influenced by the conduction properties of these electrolytes. Examples of electrolytes include those having proton conductivity that mainly operate at comparatively low temperatures (for example, about 300 to 600° C.), and those having oxygen ion conductivity that mainly operate at comparatively high temperatures (for example, about 600 to 800° C.).

Figure 11A:
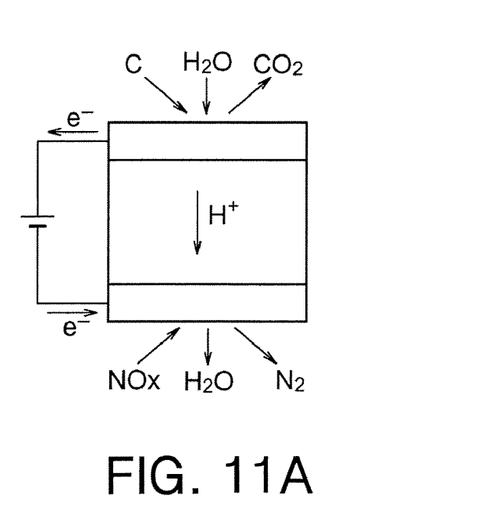
FIGS. 11A and 11B are drawings showing the operating principle of an exhaust gas purification apparatus using a conventional electrochemical device.
Figure 11B:
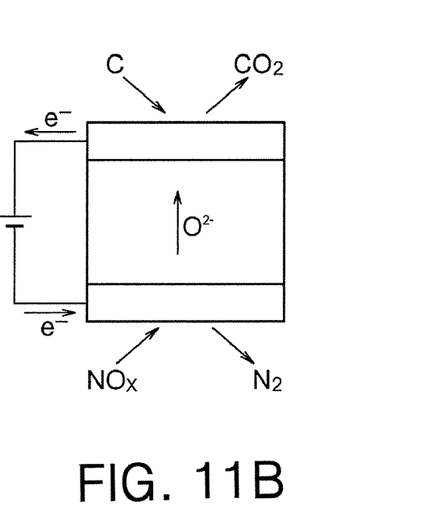

FIGS. 11A and 11B show the operating principle of an exhaust gas purification apparatus using a conventional electrochemical device. FIG. 11A shows an apparatus using an electrolyte having proton conductivity, while FIG. 11B shows an apparatus using an electrolyte having oxygen ion conductivity. In both types, carbon is purified by being converted to $CO_2$ at the anode, while nitrogen oxides (NOx) are purified by being converted to $N_2$ at the cathode. $H_2O$ and the like are required to mediate the reaction in the case of FIG. 11A.

In this manner, in an electrochemical device of the prior art, the optimum material is selected for the electrolytes, corresponding to the temperature and other aspects of the environment in which the electrochemical device is to be used.

Japanese Patent Application Laid-open No. 2003-265931 discloses an example of this type of electrochemical device in the form of an electrochemical reactor for purifying exhaust gas. This electrochemical reactor uses an electrolyte having oxygen ion conductivity for the electrolyte.

However, electrochemical devices of the prior art had a problem since the environment in which they can be operated, was limited depending on the type of electrolyte used.

For example, a device using a proton conductive electrolyte no longer operates efficiently as temperatures rise due to a decrease in electrical conductivity. In addition, a device using an oxygen ion conductive electrolyte differs from proton conductive electrolytes in that it no longer operates efficiently as temperatures lower. Consequently, it is difficult to select a suitable electrolyte in cases requiring a wide operating temperature range.

This problem becomes particularly conspicuous in engine exhaust gas treatment apparatuses. For example, since the temperature of exhaust gas from a vehicular diesel engine extends over a wide range of 100 to 800° C., it is difficult to suitably select an electrolyte that operates over such an entire temperature range.

SUMMARY OF THE INVENTION

In accordance with an aspect of the present invention, an electrochemical device has an anode, a cathode, an electrolyte layer arranged between the anode and the cathode. The electrolyte layer includes a first electrolyte constituting a first conductive pathway connecting the anode and the cathode, and a second electrolyte constituting a second conductive pathway connecting the anode and the cathode. The second electrolyte exhibits conduction properties different from those of the first electrolyte.

DESCRIPTION OF THE PREFERRED EMBODIMENTS

The following provides an explanation of embodiments of the present invention based on the appended drawings.

First Embodiment

Figure 1:
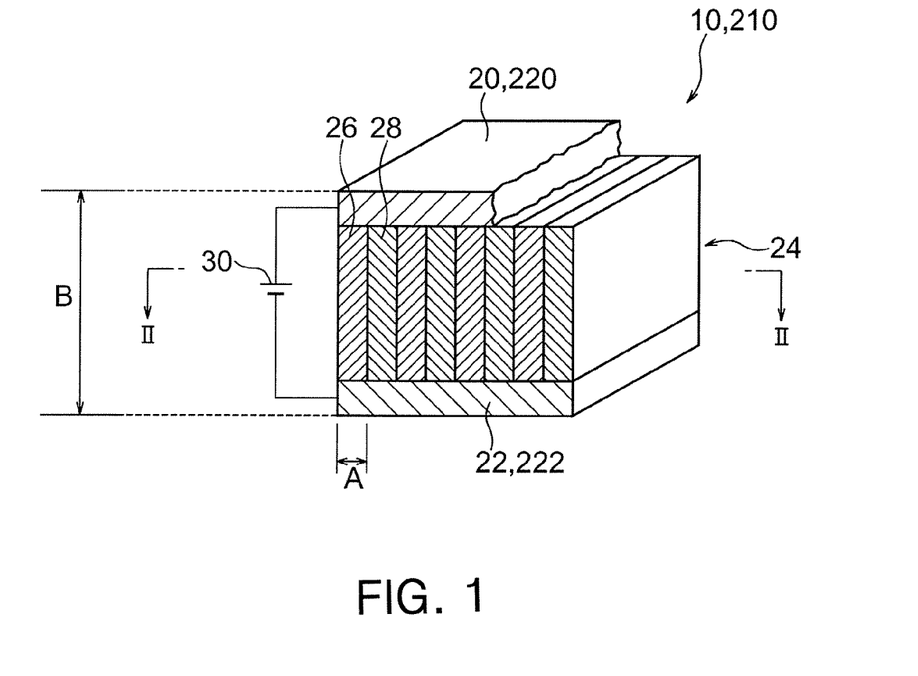
FIG. 1 is a drawing showing the construction of an electrochemical device and the periphery thereof as disclosed in a first embodiment.
Figure 2:
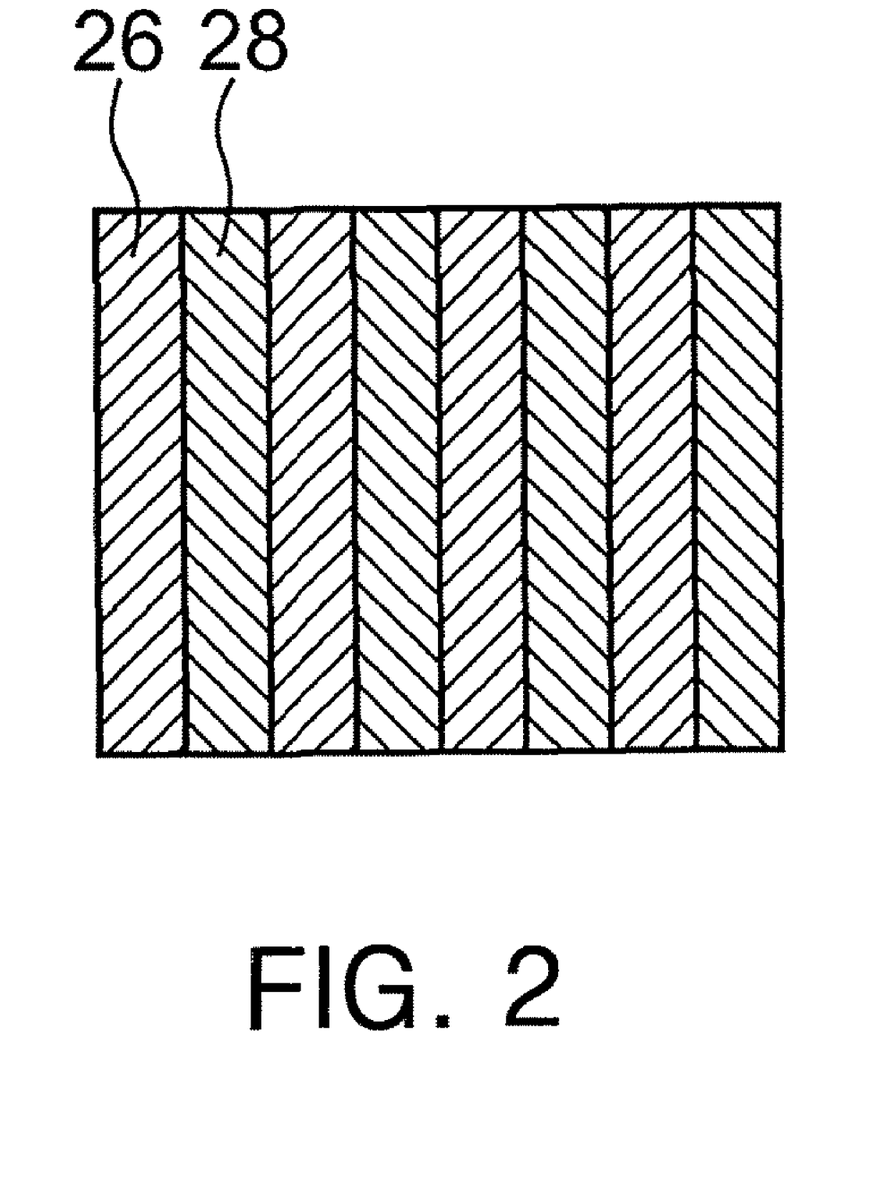
FIG. 2 is a cross-sectional view taken along line II-II of the electrochemical device shown in FIG. 1.
Figure 3:
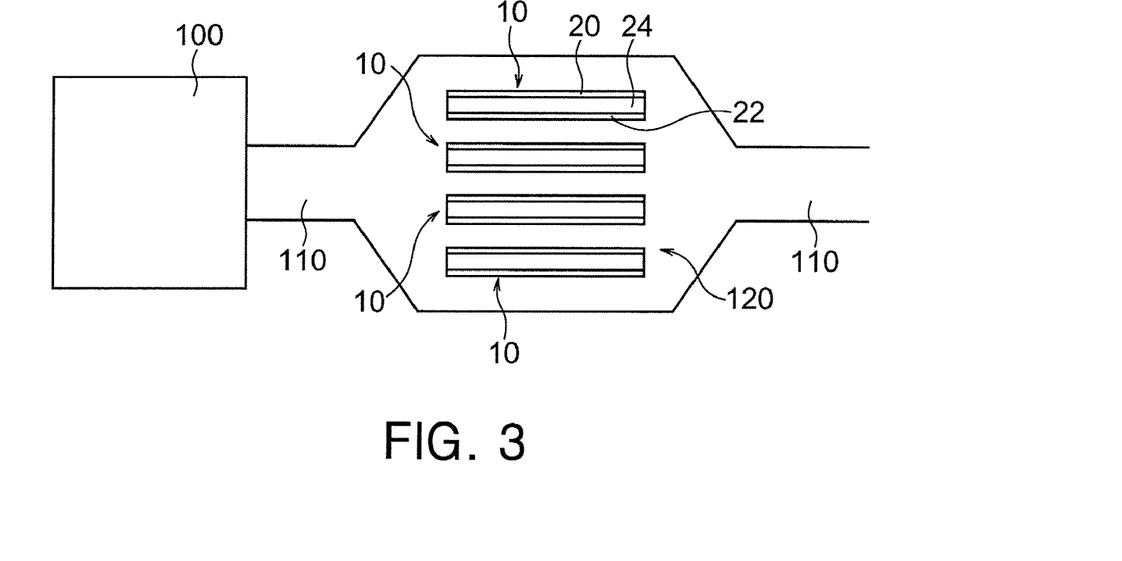
FIG. 3 shows a construction in which electrochemical devices of FIG. 1 are arranged in a vehicular exhaust system.

FIGS. 1 to 3 are drawings showing the construction of an electrochemical device 10 along with the periphery thereof related to a first embodiment. In the present embodiment, the electrochemical device 10 is used to purify exhaust gas discharged from the internal combustion engine of a vehicle. Furthermore, as will be described later, this purification is carried out by decomposing nitrogen oxides (NOx) and particulate matter (PM) contained in exhaust gas.

As schematically shown in FIG. 1, the electrochemical device 10 is electrically connected to an external battery 30. The electrochemical device 10 is provided with electrodes in the form of an anode 20 and a cathode 22, anode 20 is connected to the cathode of battery 30, and cathode 22 is connected to the anode of battery 30.

The electrochemical device 10 is provided with an electrolyte layer 24 containing electrolytes arranged between anode 20 and cathode 22. Electrolyte layer 24 allows movement of ions between the anode 20 and the cathode 22. A pathway for this movement of ions serves as a conductive pathway in the electrolyte layer 24.

In the present embodiment, the electrolyte layer 24 is composed by alternatively laminating two types of electrolytes formed in the shape of plates, namely proton conductors 26 which are a first electrolyte constituting a first conductive pathway, and oxygen ion conductors 28 which are a second electrolyte constituting a second conductive pathway and exhibiting conduction properties different from those of the first electrolyte. The proton conductors 26 are an electrolyte that exhibits conductivity with respect to protons ($H^+$), while the oxygen ion conductors 28 are an electrolyte that exhibits conductivity with respect to oxygen ions ($O^{2-}$). In this manner, the electrochemical device 10 is provided with a plurality of types of conductive pathways. Namely, the first conductive pathway comprised of the proton conductors 26 and the second conductive pathway comprised of the oxygen ion conductors 28 are provided in the form of conductive pathways connecting the anode 20 and the cathode 22.

Anode 20 is formed by coating platinum (Pt) onto a support body constituting electrolyte formed into the shape of a plate, followed by firing thereof. Furthermore, the coating material may be any substance, such as rhodium (Rh), provided it has high catalytic activity.

The cathode 22 is formed by adding barium (Ba) to a nickel (Ni)-based material containing yttria-stabilized zirconia (YSZ) and $BaCeO_3$. Furthermore, another material such as a magnesium (Mg)-based material may be used instead of an Ni-based material. In addition, the Ba added to the cathode 22 may be any other substance provided it has the effect of occluding NOx.

The proton conductors 26 contain perovskite $BaCeO_3$. In addition, $SrCeO_3$ may be contained instead of or in addition to the perovskite $BaCeO_3$.

Oxygen ion conductors 28 contain YSZ. In addition, samaria-doped ceria (SDC) or gadolinia-doped ceria (GDC) and the like may be contained instead of or in addition to the YSZ.

Furthermore, the proton conductors 26 and the oxygen ion conductors 28 may be composed of any other substances provided they satisfy the required conditions in terms of electrical conductivity and strength.

Due to the differences in these materials, the proton conductors 26 and the oxygen ion conductors 28 have different temperature properties. The proton conductors 26 have first temperature characteristics and operate efficiently at comparatively low temperatures, operating at temperatures of, for example, 300 to 600° C. The oxygen ion conductors 28 have second temperature characteristics and operate efficiently at comparatively high temperatures, operating at temperatures of, for example, 600 to 800° C.

FIG. 2 is a cross-sectional view taken along line II-II of the electrochemical device 10 of FIG. 1. This is a cross-section of the conductive pathways, namely a cross-section taken along a plane perpendicular to the direction in which ions are conducted through electrolyte layer 24.

The proton conductors 26 and the oxygen ion conductors 28 are formed so as to be laminated to form a sandwich structure in the electrolyte layer 24, and regions composed of the proton conductors 26 and regions composed of the oxygen ion conductors 28 are included in the cross-section shown in FIG. 2.

The electrochemical device 10 is produced in, for example, the manner described below.

First, an electrolyte is formed in the shape of a plate. This is carried out by a known technology such as printing or coating. Subsequently, proton conductors 26 are formed by firing. Oxygen ion conductors 28 are formed in the same manner.

After forming the plate-shaped proton conductors 26 and the plate-shaped oxygen ion conductors 28, the conductors are arranged by alternate lamination as shown in FIG. 1, followed by pressing to form electrolyte layer 24. Additional firing is not carried out at this stage.

Next, anode 20 and cathode 22 are formed using a known technology such as screen printing on the opposite sides of the electrolyte layer 24, namely both end surfaces of the support body. The electrochemical device 10 is thus formed in this manner.

Here, the proton conductors 26 and the oxygen ion conductors 28 are, for example, formed to have the same thickness. This thickness refers to the smallest dimension in the direction perpendicular to the direction in which ions are conducted, namely dimension A in FIG. 1. In the present embodiment, the proton conductors 26 and the oxygen ion conductors 28 are formed to have a thickness of 1 mm or less so that charge is uniformly transferred over the entire surface of the electrodes.

However, the proton conductors 26 and the oxygen ion conductors 28 may have different thicknesses. For example, the proton conductors 26 and the oxygen ion conductors 28 may be formed to have proportional thicknesses so that overall ion conduction efficiency increases corresponding to differences in their respective conduction properties.

In addition, there may be any number of laminations of the proton conductors 26 and the oxygen ion conductors 28. For example, the conductors may be designed so that the electrodes can be suitably formed in accordance with electrode formation technology. In the case of forming electrodes by screen printing, the conductors are designed corresponding to the size of the electrode formation apparatus so that the electrodes can have a uniform thickness.

The total thickness of the electrochemical device 10, namely dimension B in FIG. 1, is designed according to the location, where the electrochemical device 10 is to be installed in a vehicle, and the surrounding structure. This applies similarly to the surface area and shape of electrochemical device 10.

FIG. 3 shows a construction in which the electrochemical devices 10 are arranged in a vehicular exhaust system.

An exhaust pipe 110 is connected to an internal combustion engine 100, an exhaust gas generated in internal combustion engine 100 is discharged to the outside through the exhaust pipe 110. A purification apparatus 120 for purifying exhaust gas is provided within the exhaust pipe 110, and exhaust gas is made to pass through the inside of this purification apparatus 120. The purification apparatus 120 includes a plurality of the electrochemical devices 10. Note that the battery 30 of FIG. 1 is not shown in FIG. 3.

The plurality of electrochemical devices 10 are arranged overlapped at fixed intervals in the same orientation. This orientation is, for example, parallel to the direction in which exhaust gas flows over the electrode surfaces of the electrochemical devices 10. Namely, the anode 20 of one electrochemical device 10 and the cathode 22 of an adjacent electrochemical device 10 are arranged so as to be facing in parallel. Consequently, exhaust gas passing through the inside of the purification apparatus 120 flows through the space between an adjacent anode 20 and cathode 22.

Next, an explanation is provided of the operation of the electrochemical device 10 and purification apparatus 120 in the present embodiment.

In FIG. 3, exhaust gas is generated by the operation of the internal combustion engine 100, and this exhaust gas reaches purification apparatus 120 by passing through the exhaust pipe 110. The exhaust gas flows through the inside of purification apparatus 120, and contacts the surfaces of the anode 20 and the cathode 22 of the electrochemical device 10 or passes over their periphery at this time. Purification of exhaust gas by the electrochemical device 10, namely decomposition of PM and NOx, is carried out here.

Figure 4A:
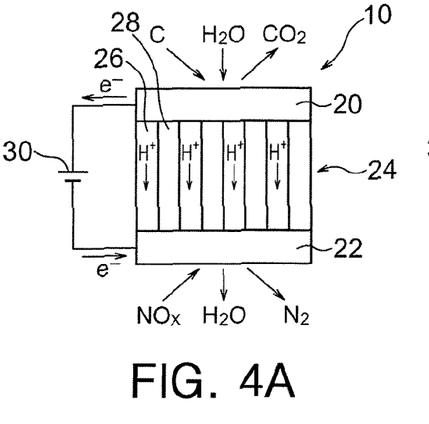
FIGS. 4A and 4B are drawings showing operation of the electrochemical device of FIG. 1 during purification of exhaust gas.
Figure 4B:
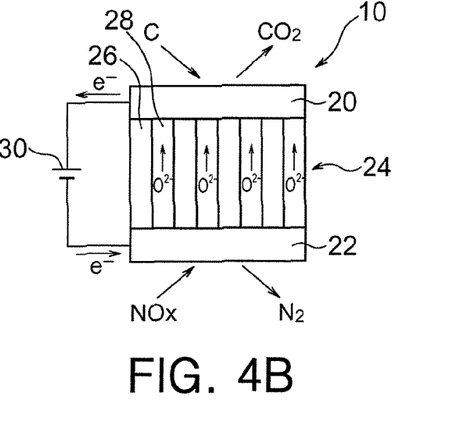

FIGS. 4A and 4B are drawings showing the operation of electrochemical device 10 during purification of exhaust gas. FIG. 4A shows operation over a first temperature range which is a comparatively low temperature range, while FIG. 4B shows operation over a second temperature range which is a comparatively high temperature range.

As shown in FIG. 4A, transfer of charge is mainly carried out by protons via the proton conductors 26 containing $BaCeO_3$ at comparatively low temperatures of, for example, 300 to 600° C.

Carbon contained in PM in the exhaust gas and $H_2O$ in the exhaust gas react on the surface of the anode 20 and around the periphery thereof resulting in the formation of $CO_2$, protons and electrons. Electrons are attracted to the cathode of battery 30 and migrate to battery 30, while protons are attracted to the cathode 22 and migrate within the proton conductors 26. $CO_2$ is discharged to the outside air through the exhaust pipe 110. In this manner, exhaust gas is purified as a result of PM being decomposed around the periphery of anode 20.

NOx present in exhaust gas and protons conducted by the proton conductors 26 react as a result of receiving electrons supplied from the battery 30 on the surface of the cathode 22 and around the periphery thereof, whereby $N_2$ and $H_2O$ are formed. The formed $N_2$ and $H_2O$ are discharged to the outside air through the exhaust pipe 110. In this manner, exhaust gas is purified as a result of decomposing NOx at the periphery of cathode 22.

As shown in FIG. 4B, transfer of charge is mainly carried out by oxygen ions via the oxygen ion conductors 28 containing YSZ at comparatively high temperatures of, for example, 600 to 800° C.

Carbon contained in PM present in exhaust gas and oxygen ions conducted by oxygen ion conductors 28 react on the surface of the anode 20 and at the periphery thereof, resulting in the formation of $CO_2$ and electrons. The electrons are attracted to the cathode of the battery 30 and migrate to the battery 30, while the $CO_2$ is discharged to the outside air through the exhaust pipe 110. In this manner, exhaust gas is purified as a result of PM being decomposed at the periphery of anode 20.

NOx present in exhaust gas reacts by receiving electrons supplied from the battery 30 on the surface of the cathode 22 and at the periphery thereof, resulting in the formation of oxygen ions and $N_2$. Oxygen ions are attracted to anode 20 and migrate inside the oxygen ion conductors 28, while $N_2$ is discharged to the outside air through the exhaust pipe 110. In this manner, exhaust gas is purified as a result of NOx being decomposed at the periphery of cathode 22.

In this manner, since the electrochemical device 10 and the exhaust gas purification apparatus 120 according to the present embodiment are provided with the proton conductors 26, which constitute the first conductive pathway that operates at a comparatively low temperature, and the oxygen ion conductors 28, which constitute the second conductive pathway that operates at a comparatively high temperature, they are able to operate over a wide temperature range.

An example of an application that allows the obtaining of extraordinary effects is an apparatus for purifying exhaust gas from a vehicular diesel engine. Since the exhaust gas temperature of a diesel engine extends over a wide range, conventional electrochemical devices were unable to operate efficiently over that entire temperature range. However, electrochemical device 10 and exhaust gas purification apparatus 120 according to the present embodiment are able to reliably purify exhaust gas by operating over the entire temperature range thereof.

In addition, with a construction that simply combines two types of electrochemical devices, such as a construction in which a proton conductive electrochemical device and an oxygen ion conductive electrochemical device are arranged in parallel, different control is required for each device. Since current regulation, or the like, has to be controlled for each type of device, complex control is required. In contrast, since the electrochemical device 10 according to the present embodiment automatically uses the pathway having the highest conductivity corresponding to the environment, only one type of control is required for the device, thereby simplifying control.

Moreover, in a construction simply combining two types of electrochemical devices, both types of devices are not used equally according to the environment, thereby resulting in a difference in the degree of wear. In contrast, since electrochemical device 10 according to the present embodiment has layers of thin plate-like electrolytes, the electrode can be used holistically and equally regardless of the state in which any of the electrolytes is operating, thereby making the degree of wear equal and lengthening the life of the entire purification apparatus.

Moreover, in a construction that simply combines two types of electrochemical devices, it is necessary to form electrodes independently for both types of devices, thereby resulting in increased size of the apparatus. In contrast, since the electrochemical device 10 according to the present embodiment shares electrodes between two types of electrolytes, the size of the apparatus can be reduced.

In the first embodiment as described above, the electrochemical device 10 is used as a purification apparatus 120 for exhaust gas from a vehicle. As a variation thereof, electrochemical device 10 may also be used as a purification apparatus for exhaust gas from a source other than a vehicle. For example, the electrochemical device 10 may be used in agricultural machinery or power generation plants. The electrochemical device 10 may be used for other exhaust gas provided it contains carbon and NOx.

Second Embodiment

The electrochemical device 10 is used as a purification apparatus for exhaust gas in the above-mentioned first embodiment and variation thereof. In this second embodiment, an electrochemical device is used as a hydrogen generation apparatus.

Since the construction and operation of electrochemical device 210 shown in FIG. 1 as described in the present embodiment are similar to those of the electrochemical device 10 as disclosed in the first embodiment, with some exceptions, the following provides an explanation of only the differences therebetween.

The electrochemical device 210 generates hydrogen from a reformed gas to be supplied. The constructions, shapes and formation methods of anode 220 and cathode 222 are in accordance with known technologies suitable for hydrogen generation apparatuses.

The electrochemical device 210 according to the present embodiment operates in the manner described below.

At comparatively low temperatures, such as 300 to 600° C., transfer of charge is mainly carried out by protons via the proton conductors 26 containing $BaCeO_3$. This is similar to the operation shown in FIG. 4A.

However, $CH_4$ in the reformed gas is oxidized and protons are formed on the surface and at the periphery of the anode 220. The formed protons migrate inside the proton conductors 26 and reach the cathode 222 where they receive electrons to form hydrogen $H_2$ on the surface or at the periphery thereof. In this manner, the electrochemical device 210 forms hydrogen from reformed gas.

At comparatively high temperatures, such as 600 to 800° C., transfer of charge is carried out mainly by oxygen ions via the oxygen ion conductors 28 containing YSZ. This is similar to the operation shown in FIG. 4B.

However, $CH_4$ in the reformed gas reacts by receiving oxygen ions conducted by the oxygen ion conductors 28 on the surface and at the periphery of the anode 220, resulting in the formation of $CO_2$ and $H_2O$. $H_2O$ in the reformed gas then receives electrons on the surface and at the periphery of the cathode 222, resulting in the formation of oxygen ions and hydrogen $H_2$. In this manner, the electrochemical device 210 forms hydrogen from reformed gas.

In this manner, similar to the first embodiment, since the electrochemical device 210 according to the present embodiment is provided with the proton conductors 26, which constitutes a first conductive pathway that operates at a comparatively low temperature, and the oxygen ion conductors 28, which constitutes a second conductive pathway that operates at a comparatively high temperature, operation over a wide temperature range can be achieved.

In the second embodiment as described above, the electrochemical device 210 generates hydrogen from a reformed gas. As a variation thereof, the electrochemical device 210 may also generate hydrogen from steam. Namely, $O_2$ may be formed on the side of anode 220 while $H_2$ may be formed on the side of cathode 222 by decomposing $H_2O$.

Third Embodiment

In the first and second embodiments described above, the electrochemical devices 10 and 210 are used as devices that operate by being supplied with electrical power from the battery 30. In this third embodiment, an electrochemical device is used as a fuel cell for generating electricity.

Figure 5:
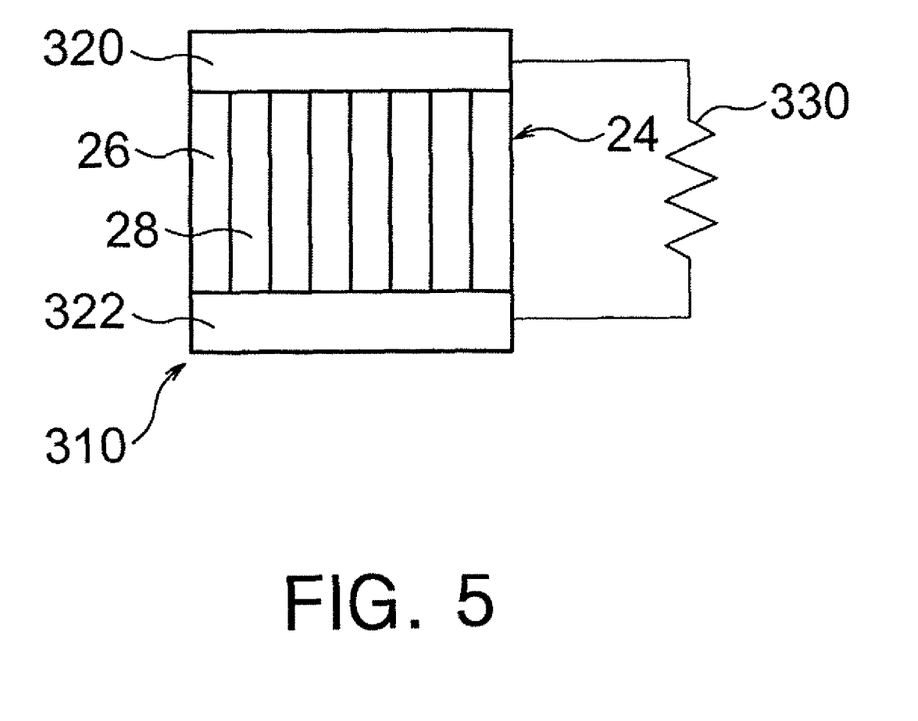
FIG. 5 is a drawing showing the construction of an electrochemical device and the periphery thereof as disclosed in a third embodiment.

FIG. 5 is a drawing showing the construction of an electrochemical device 310 related to the present embodiment and the periphery thereof. Since the construction of electrochemical device 310 is similar to that of the electrochemical device 10 of the first embodiment, with some exceptions, the following provides an explanation of the differences therebetween.

The electrochemical device 310 generates electricity by reacting supplied hydrogen and oxygen, and supplies electrical power to a load 330. The compositions, shapes and formation methods of the anode 320 and the cathode 322 are in accordance with known technologies suitable for fuel cells.

The following provides an explanation of an operation of the electrochemical device 310 in the present embodiment.

Figure 6A:
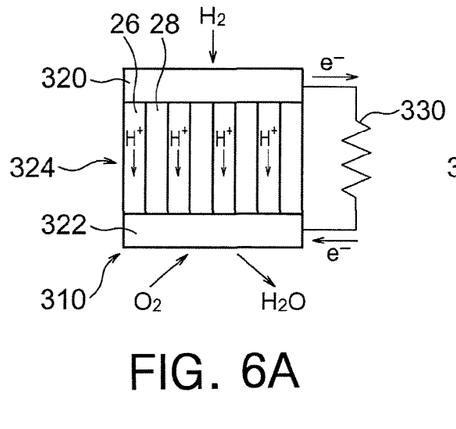
FIGS. 6A and 6B are drawings showing the operation of the electrochemical device of FIG. 5 during generation of electricity.
Figure 6B:
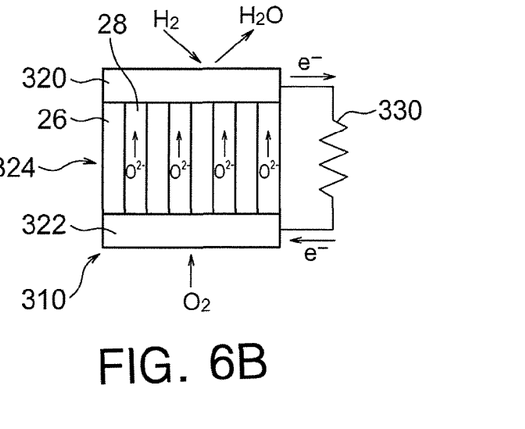

FIGS. 6A and 6B are drawings showing the operation of electrochemical device 310 during generation of electricity. FIG. 6A shows operation at a first temperature range which is a comparatively low temperature range, while FIG. 6B shows operation at a second temperature range which is a comparatively high temperature range.

As shown in FIG. 6A, transfer of charge is mainly carried out via the proton conductors 26 at a comparatively low temperature range of, for example, 300 to 600° C.

The supplied $H_2$ releases electrons resulting in the formation of protons on the surface and at the periphery of the anode 320. The electrons are supplied to the load 330, while the protons are attracted to the cathode 322 and migrate inside the proton conductors 26. The supplied $O_2$ and the protons conducted by the proton conductors 26 react by receiving electrons from the load 330, resulting in the formation of $H_2O$ on the surface and at the periphery of the cathode 322.

In this manner, the electrochemical device 310 supplies electrical power to the load 330.

As shown in FIG. 6B, transfer of charge is carried out mainly via the oxygen ion conductors 28 at comparatively high temperatures of, for example, 600 to 800° C.

The supplied $H_2$ and oxygen ions conducted by the oxygen ion conductors 28 react and release electrons on the surface and at the periphery of the anode 320, resulting in the formation of $H_2O$. The electrons are supplied to the load 330. The supplied $O_2$ receives electrons from the load 330 resulting in the formation of oxygen ions on the surface and at the periphery of the cathode 322, and the oxygen ions are attracted to the anode 320 and migrate inside the oxygen ion conductors 28.

In this manner, the electrochemical device 310 supplies electrical power to the load 330.

In this manner, similar to the first embodiment, since the electrochemical device 310 according to the present embodiment is provided with the proton conductors 26, which constitutes a first conductive pathway that operates at a comparatively low temperature, and the oxygen ion conductors 28, which constitutes a second conductive pathway that operates at a comparatively high temperature, operation over a wide temperature range can be achieved.

Fourth Embodiment

In a fourth embodiment, the proton conductors 26 and the oxygen ion conductors 28, which are formed into the shape of plates in the previously described first to third embodiments, are formed into the shape of rods.

Figure 7:
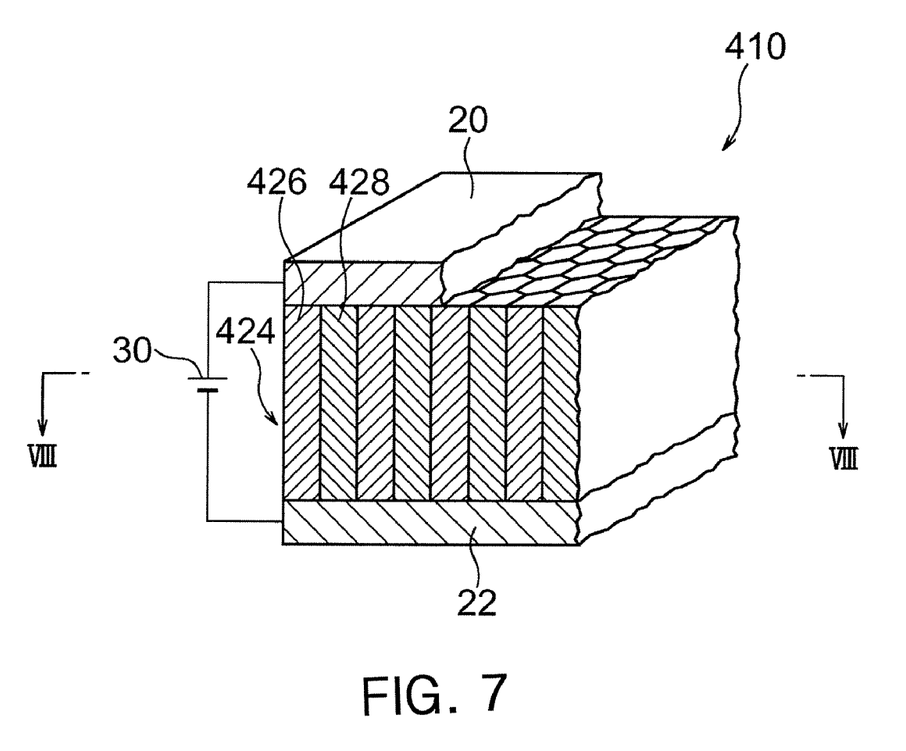
FIG. 7 is a drawing showing the construction of an electrochemical device and the periphery thereof as disclosed in a fourth embodiment.

FIG. 7 is a drawing showing the construction of an electrochemical device 410 related to the present embodiment and the periphery thereof. The electrochemical device 410 is used in an exhaust gas purification apparatus, hydrogen generation apparatus or fuel cell as previously explained in the first to third embodiments.

The electrochemical device 410 is provided with an electrolyte layer 424 containing electrolytes arranged between the anode 20 and the cathode 22. The following provides an explanation of only the differences between the electrolyte layer 424 in the present embodiment and the electrolyte layer 24 in the first to third embodiments.

Figure 8:
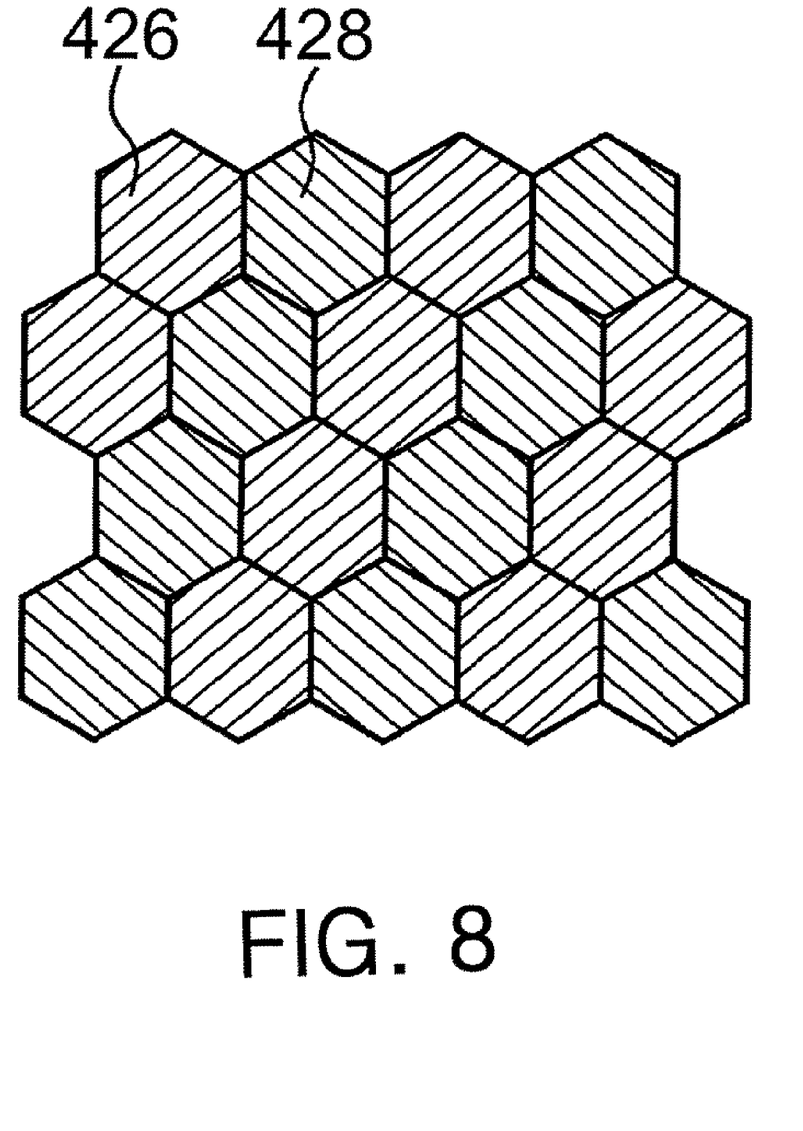
FIG. 8 is a partial cross-sectional view taken along line VIII-VIII of the electrochemical device of FIG. 7.

FIG. 8 is a partial cross-sectional view taken along line VIII-VIII of the electrochemical device 410 of FIG. 7. This cross-section is a cross-section of the conductive pathways, namely a cross-section resulting from a plane perpendicular to the direction in which ions are conducted through electrolyte layer 424.

As shown in FIGS. 7 and 8, the electrolyte layer 424 includes the proton conductors 426 and the oxygen ion conductors 428 formed into the shape of hexagonal columns. The proton conductors 426 and the oxygen ion conductors 428 are arranged in parallel and arranged so that there are no gaps therebetween (or such that the size of the gaps is minimized). The anode 20 and the cathode 22 are formed so as to cover respective one of the opposing end surfaces, of the hexagonal column-shaped proton conductors 426 and oxygen ion conductors 428.

The electrochemical device 410 is provided with a plurality of types of conductive pathways. Namely, the electrochemical device 410 is provided with conductive pathways connecting the anode 20 and the cathode 22, in the form of a first conductive pathway comprised of the proton conductors 426 and a second conductive pathway comprised of the oxygen ion conductors 428. In addition, as shown in FIG. 8, regions composed of the proton conductors 426 and regions composed of the oxygen ion conductors 428 are contained in a cross-section of the conductive pathways.

In this manner, similar to the first embodiment, since the electrochemical device 410 and an exhaust gas purification apparatus according to the present embodiment are provided with the proton conductors 426 constituting a first conductive pathway that operates at a comparatively low temperature, and the oxygen ion conductors 428 constituting a second conductive pathway that operates at a comparatively high temperature, they are able to operate over a wide temperature range.

Furthermore, although the proton conductors 426 and the oxygen ion conductors 428 are in the shape of hexagonal columns in the present embodiment, they may also be in the shape of circular columns, square columns, rectangular solids, or other long, narrow shapes, and may be of any shape provided they are in the shape of rods.

Fifth Embodiment

A fifth embodiment alters the construction of the electrolyte layer 24 in the previously described first to third embodiments.

Figure 9:
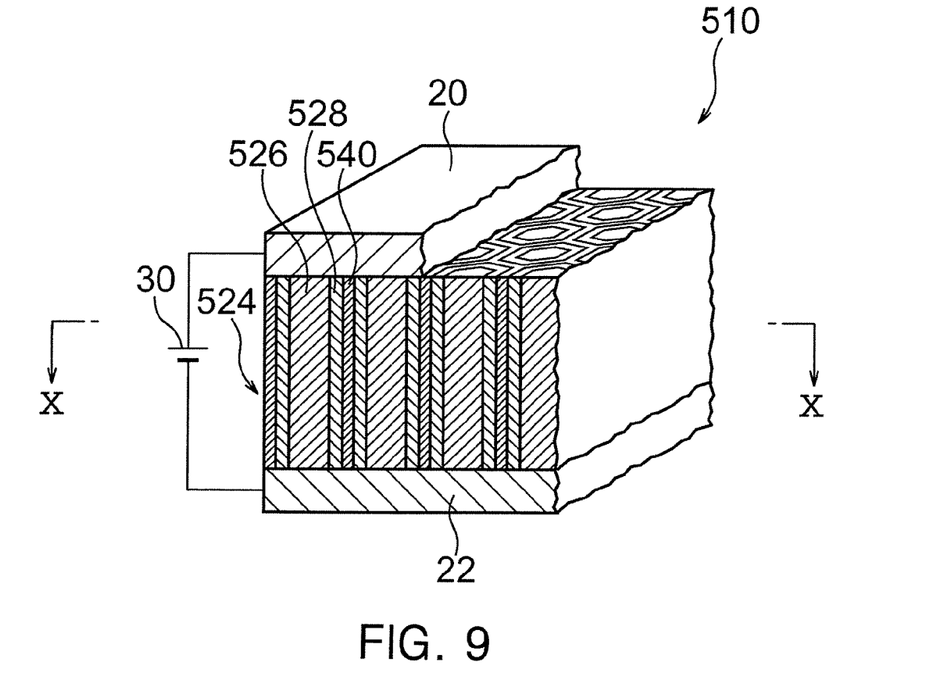
FIG. 9 is a drawing showing the construction of an electrochemical device and the periphery thereof as disclosed in a fifth embodiment.

FIG. 9 is a drawing showing the construction of an electrochemical device 510 as described in the present embodiment and the periphery thereof. As explained in the first to third embodiments, the electrochemical device 510 is used in an exhaust gas purification apparatus, hydrogen generation apparatus or fuel cell.

The electrochemical device 510 is provided with an electrolyte layer 524 including electrolytes arranged between anode 20 and cathode 22. The following provides an explanation of only the differences between the electrolyte layer 524 in the present embodiment and the electrolyte layer 24 in the first to third embodiments.

Figure 10:
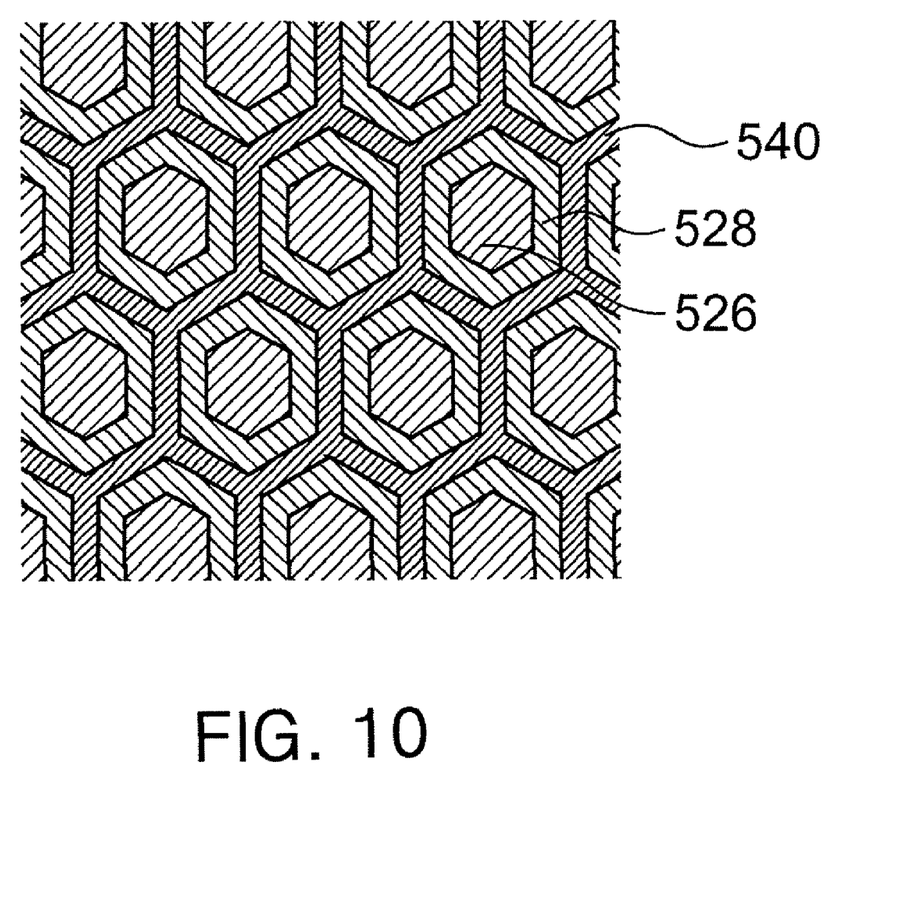
FIG. 10 is a partial cross-sectional view taken along line X-X of the electrochemical device of FIG. 9.

FIG. 10 is a partial cross-sectional view taken along line X-X of the electrochemical device 510 of FIG. 9. This cross-section is a cross-section of the conductive pathways, namely a cross-section resulting from a plane perpendicular to the direction in which ions are conducted through electrolyte layer 524.

As shown in FIGS. 9 and 10, the electrolyte layer 524 includes a support body 540 having a honeycomb structure. The support body 540 has a large number of voids in the shape of hexagonal columns, the oxygen ion conductors 528 are formed within the voids, and the proton conductors 526 are formed within the oxygen ion conductors 528. The proton conductors 526 are in the shape of a hexagonal column, while the oxygen ion conductors 528 are in the shape of a hexagonal column in which the inside thereof has been cut out in the shape of a hexagonal column.

This electrolyte layer 524 is produced in, for example, the manner described below.

First, support body 540 having a honeycomb structure is formed. This is carried out using a known technology. Although the support body 540 is composed of, for example, cordierite, it may also be composed of SiC.

Next, an electrolyte exhibiting conductivity with respect to oxygen ions $O^{2-}$ is impregnated into the support body 540. Namely, the support body 540 is immersed in an electrolyte solution. Alternatively, the electrolyte may be coated onto the surface of the support body 540. Here, impregnation or coating is carried out to a degree in which electrolyte is not completely filled into the voids of the support body 540, namely to a degree in which voids remain within the formed oxygen ion conductor 528.

Next, the support body 540 is fired. As a result, the oxygen ion conductors 528 are formed containing the electrolyte having oxygen ion conductivity.

Next, an electrolyte exhibiting conductivity with respect to protons $H^+$ is impregnated into the support body 540. Namely, the support body 540 is immersed in an electrolyte solution. Alternatively, this electrolyte may be further coated onto the surface of the oxygen ion conductors 528 already formed on the support body 540. In this manner, voids within the oxygen ion conductors 528 are filled by the proton conductors 526.

Next, the support body 540 is fired. As a result, the proton conductors 526 are formed containing the electrolyte having proton conductivity.

Next, the anode 20 and the cathode 22 are formed using a known technology such as screen printing in the same manner as the first embodiment. The electrochemical device 510 is formed in this manner.

The dimensions of the electrochemical device 510 are determined in the same manner as the electrochemical device 10 of the first embodiment. Furthermore, the volume ratio of the proton conductor 526 to the oxygen ion conductor 528 is, for example, 1:1. In this case, the cross-sectional surface areas of the proton conductors 526 and the oxygen ion conductors 528 shown in FIG. 10 are equal to each other.

However, the proton conductors 526 and the oxygen ion conductors 528 may also have different volumes or different cross-sectional surface areas. For example, the proton conductors 526 and the oxygen ion conductors 528 may be composed at such a ratio that overall ion conduction efficiency increases corresponding to differences in the respective conduction properties.

The electrochemical device 510 is provided with a plurality of types of conductive pathways. Namely, the electrochemical device 510 is provided with a first conductive pathway composed of the proton conductors 526 and a second conductive pathway composed of the oxygen ion conductors 528 as conductive pathways connecting the anode 20 and the cathode 22. In addition, as shown in FIG. 10, a cross-section of the conductive pathways includes regions composed of the proton conductors 526 and regions composed of the oxygen ion conductors 528.

In this manner, similar to the first embodiment, since the electrochemical device 510 and an exhaust gas purification apparatus in the present embodiment are provided with the proton conductors 526 constituting a first conductive pathway that operates at a comparatively low temperature, and the oxygen ion conductors 528 constituting a second conductive pathway that operates at a comparatively high temperature, they are able to operate over a wide temperature range.

Furthermore, although the support body 540 has a honeycomb structure in the present embodiment, any structure may be employed provided the proton conductors 526 and the oxygen ion conductors 528 can be supported, and may have, for example, a grid structure.

In the first to fifth embodiments as described above, an electrolyte having proton conductivity and an electrolyte having oxygen ion conductivity are used as a combination of two types of electrolytes. As a variation thereof, a combination of two types of electrolytes may also be used such that they have conductivity with respect to the same ions but have different temperature characteristics. Namely, a combination consisting only of two types of electrolytes having proton conductivity may be used, or a combination consisting only of two types of electrolytes having oxygen ion conductivity may be used. As a result of employing such a configuration, an electrolyte layer can be formed that more suitably matches various required temperature characteristics.

In addition, the combination of two types of electrolytes is not limited to those having different conduction properties with respect to temperature, but a combination of two types of electrolytes that have different conduction properties with respect to various different conditions may also be used. As a result of employing such a configuration, an electrolyte layer can be composed that more suitably matches various environmental conditions.

In addition, although the previously described first to fifth embodiments include only two types of electrolytes, as a variation thereof, three or more types of electrolytes may also be included. For example, in the case of a laminated structure as shown in FIG. 1, three or more types of electrolyte layers may be laminated in a cyclical manner. As a result of employing such a construction, an electrolyte layer can be formed that more suitably matches a wider range of conditions.

Therefore, the present examples and embodiments are to be considered as illustrative and not restrictive and the invention is not to be limited to the details given herein but may be modified within the scope of the appended claims.

This application claims a foreign priority benefit based on Japanese Patent Application No. 2007-300624, filed on Nov. 20, 2007, which is hereby incorporated by reference herein in its entirety as if fully set forth herein.

What is claimed is:

1. An electrochemical device, comprising:
an anode;
a cathode; and
an electrolyte layer arranged between the anode and the cathode, the electrolyte layer including:
a first electrolyte constituting a first conductive pathway connecting the anode and the cathode; and
a second electrolyte constituting a second conductive pathway connecting the anode and the cathode, the second electrolyte exhibiting conduction properties different from those of the first electrolyte, wherein
the first electrolyte and the second electrolyte have different conduction properties with respect to temperature,
the first electrolyte is a proton conductive electrolyte,
the second electrolyte is an oxygen ion conductive electrolyte,
the anode is shared between the first electrolyte and the second electrolyte, and
the cathode is shared between the first electrolyte and the second electrolyte, wherein the electrochemical device automatically uses the pathway having the highest conductivity corresponding to the environment.

2. The electrochemical device according to claim 1, wherein the first electrolyte and the second electrolyte are formed into one of a plate-like shape and a rod-like shape.

3. An exhaust gas purification apparatus, comprising the electrochemical device according to claim 1, wherein the first electrolyte and the second electrolyte are formed in a plate-like shape and are alternately laminated.

* * * * *